(12) United States Patent
Chern et al.

(10) Patent No.: US 9,175,733 B2
(45) Date of Patent: *Nov. 3, 2015

(54) TRANSMISSION CLUTCH ASSEMBLIES WITH SQUAWK REDUCTION TECHNIQUES

(75) Inventors: Jim Chern, Troy, MI (US); Carl Garbacik, Northville, MI (US); Tony Ge, Northville, MI (US); Jau-Wen Tseng, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 408 days.

This patent is subject to a terminal disclaimer.

(21) Appl. No.: 13/351,437

(22) Filed: Jan. 17, 2012

(65) Prior Publication Data

US 2012/0111692 A1    May 10, 2012

Related U.S. Application Data

(63) Continuation-in-part of application No. 12/417,603, filed on Apr. 2, 2009, now abandoned.

(51) Int. Cl.
*F16F 15/14* (2006.01)
*F16D 25/0638* (2006.01)
*F16D 25/12* (2006.01)

(52) U.S. Cl.
CPC ............ *F16D 25/0638* (2013.01); *F16D 25/12* (2013.01); *F16D 2300/22* (2013.01); *F16F 15/14* (2013.01); *F16F 15/145* (2013.01); *Y10T 29/49826* (2015.01)

(58) Field of Classification Search
CPC ... F16F 15/14; F16F 15/223; F16F 15/13121; F16D 2300/22

USPC ............ 192/30 V; 188/378, 379; 74/573.12, 74/573.21, 574.2, 574.4; 181/207; 180/381

See application file for complete search history.

(56) References Cited

U.S. PATENT DOCUMENTS

| | | | | |
|---|---|---|---|---|
| 2,734,395 | A | * 2/1956 | Fawick | ......................... 464/180 |
| 3,295,647 | A | 1/1967 | Murphy | |
| 3,307,669 | A | 3/1967 | Klinkenberg | |
| 3,314,503 | A | * 4/1967 | Neubert | ........................ 188/379 |
| 3,368,654 | A | 2/1968 | Burnett et al. | |

(Continued)

FOREIGN PATENT DOCUMENTS

| | | |
|---|---|---|
| EP | 03186787 | 7/1989 |
| GB | 2125911 | 3/1984 |
| JP | 59126124 | 1/1983 |

OTHER PUBLICATIONS

Leissa and Chern, Closed Form Exact Solutions for the Forced Vibrations of Rectangular Plates, Pan American Congress of Applied Mechanics, 1991, pp. 710-713.

(Continued)

*Primary Examiner* — Robert Hodge
*Assistant Examiner* — Ryan Dodd
(74) *Attorney, Agent, or Firm* — James Dottavio; MacMillan, Sobanski & Todd, LLC

(57) ABSTRACT

The present disclosure relates to a vehicle transmission clutch assembly with squawk reduction techniques, having: a clutch component configured to rotate with respect to a transmission shaft; and a plurality of multi-directional mass dampers coupled to the clutch component, configured to alter a mode of vibration for the clutch component during clutch engagement.

8 Claims, 10 Drawing Sheets

(56) References Cited

U.S. PATENT DOCUMENTS

| | | | |
|---|---|---|---|
| 3,372,758 A * | 3/1968 | Jenney | 416/103 |
| 3,428,155 A | 2/1969 | Binder et al. | |
| 3,687,244 A | 8/1972 | Hillegass et al. | |
| 3,866,977 A | 2/1975 | Rice | |
| 4,139,995 A | 2/1979 | Lamarche | |
| 4,291,786 A | 9/1981 | Ito | |
| 4,475,634 A | 10/1984 | Flaim et al. | |
| 4,523,666 A | 6/1985 | Murray | |
| 4,715,485 A | 12/1987 | Rostin et al. | |
| 4,796,728 A | 1/1989 | Kanengierter et al. | |
| 4,867,284 A | 9/1989 | Okamura et al. | |
| 5,139,117 A | 8/1992 | Melinat | |
| 5,415,062 A | 5/1995 | Kohno et al. | |
| 5,666,862 A | 9/1997 | Eckel et al. | |
| 5,823,304 A | 10/1998 | Wagg | |
| 6,164,423 A | 12/2000 | Dickerson | |
| 6,286,639 B1 | 9/2001 | Uhlig | |
| 6,467,590 B2 | 10/2002 | Aydt | |
| 6,626,276 B2 * | 9/2003 | Diemer et al. | 192/30 V |
| 7,032,723 B2 | 4/2006 | Quaglia et al. | |
| 7,159,703 B2 | 1/2007 | Fukushima | |
| 7,163,095 B2 | 1/2007 | Springer et al. | |
| 7,195,111 B2 | 3/2007 | Fukushima | |
| 7,401,690 B2 | 7/2008 | Lazowski et al. | |
| 7,416,491 B2 * | 8/2008 | Campbell et al. | 464/180 |
| 2002/0017443 A1 * | 2/2002 | Diemer et al. | 192/207 |
| 2005/0183922 A1 * | 8/2005 | Springer et al. | 192/70.12 |
| 2006/0219500 A1 | 10/2006 | Lu et al. | |
| 2006/0266599 A1 | 11/2006 | Denys et al. | |
| 2007/0056815 A1 | 3/2007 | Hanna et al. | |
| 2007/0062768 A1 | 3/2007 | Hanna et al. | |
| 2007/0117640 A1 | 5/2007 | Haka | |

OTHER PUBLICATIONS

Leissa and Chern, Appropriate Analysis of the Forced Vibration Response of Plates, Journal of Vibration and Acoustics, vol. 114, 1992, pp. 106-111.

Chern, J., Forced Vibration of Plates and Shallow Shells, PhD dissertation, Ohio State University, CALL# THE: ENM1989PHDC53, 1989, 220 pages.

* cited by examiner

TRANSMISSION CLUTCH ASSEMBLIES WITH SQUAWK REDUCTION TECHNIQUES

CROSS-REFERENCE TO RELATED APPLICATIONS

This application is a continuation-in-part and claims the benefit of U.S. Non-Provisional application Ser. No. 12/417,603 titled "Vehicle Braking Assembly" filed Apr. 2, 2009, now abandoned which is hereby incorporated by reference in its entirety.

TECHNICAL FIELD

The present disclosure relates to squawk (or noise) reduction in vehicle transmission clutch assemblies.

BACKGROUND

Modern transmissions include clutch assemblies to control the relative speed of the vehicle wheels relative to engine speed. These clutch assemblies include rotating parts that alternate between engaged and disengaged positions. During clutch engagement clutch parts can vibrate with respect to the main transmission shaft. Such vibration can cause unwanted noise that is commonly referred to as "squawk." Many existing transmissions seek to reduce squawk by improving transmission lubrication or using electromechanical shift control (or e-shift). It is more effective however to add mass to one or more components of the clutch assembly in order to alter the clutch assembly mode of vibration during engagement.

There is a U.S. Pat. No. 7,163,095 titled "Clutch Assembly with Vibration Damper" that discloses the use of a damper ring that couples to a friction surface on a clutch hub to reduce self-excitation of the clutch assembly. This arrangement, however, is less efficient than the teachings in the current disclosure because it requires mass be added around an entire circumference of the clutch hub; and the connection between the clutch hub and damper ring requires friction coupling which also results in unneeded energy loss during engagement.

Accordingly, it is desirable to have a more efficient manner of reducing squawk in the vehicle transmission. As disclosed herein, it would be beneficial to use other types of mass dampers on a clutch hub, e.g., as taught with respect to vehicle braking assemblies in U.S. Non-Provisional application Ser. No. 12/417,603 titled "Vehicle Braking Assembly."

SUMMARY

The present disclosure addresses one or more of the above-mentioned issues. Other features and/or advantages may become apparent from the description which follows.

One exemplary embodiment pertains to a vehicle transmission clutch assembly with squawk reduction techniques, including: a clutch component configured to rotate with respect to a transmission shaft; and a plurality of multi-directional mass dampers coupled to the clutch component, configured to alter a mode of vibration for the clutch component during clutch engagement.

Another exemplary embodiment pertains to a vehicle transmission with squawk reduction techniques, including: a transmission shaft; a clutch component configured to rotate with respect to the transmission shaft; and a plurality of concentrated mass dampers coupled to the clutch component, configured to alter vibration of the clutch component during clutch engagement.

Another exemplary embodiment regards a method of manufacturing a transmission clutch assembly with reduced squawk during engagement, the method including: forming a clutch component; determining a mode of vibration for the clutch component during clutch engagement; and coupling a plurality of mass dampers to the clutch component to split the mode of vibration for the clutch component during engagement with respect to a first direction.

One advantage of the present disclosure is that it significantly reduces transmission squawk during clutch engagement. The disclosed techniques dampen vibration without adding mass around an entire circumference of the clutch hub. Moreover, the present teachings introduce a more efficient way of damping the transmission clutch assembly since and the connection between the clutch hub and damper is fixed and does not result in losses associated with a friction coupling, for example.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same reference numbers are used in the figures for identical or essentially identical elements. The above features and advantages and other features and advantages of the present invention are readily apparent from the following detailed description of the best modes for carrying out the invention when taken in connection with the accompanying drawings. In the figures:

Figure 1:
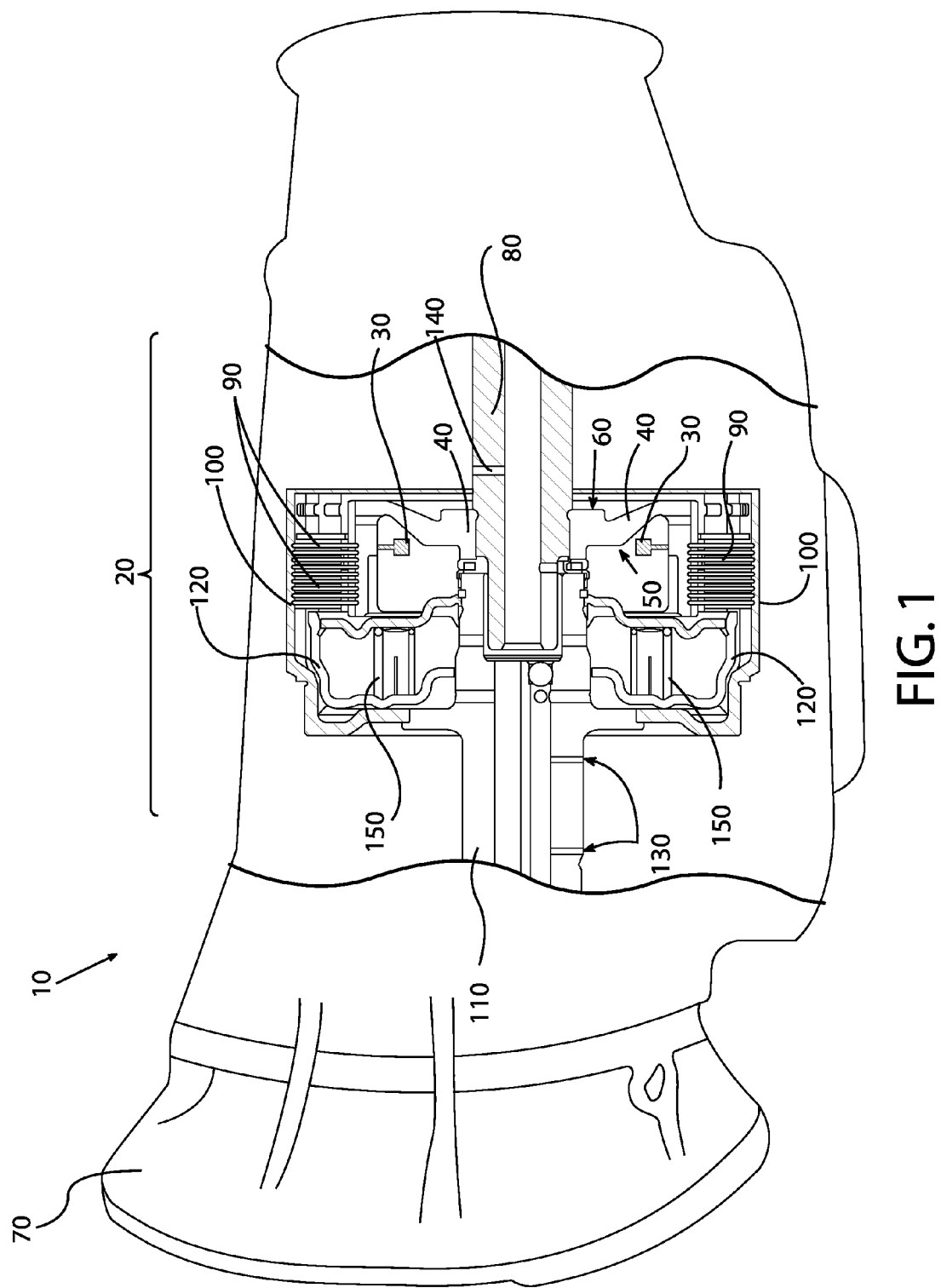
FIG. 1 is a side cross-sectional view of a vehicle transmission having an exemplary clutch assembly disposed therein.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings, wherein like characters represent the same or corresponding parts throughout the several views there are shown various embodiments of a vehicle transmission clutch assembly having improved squawk reduction techniques implemented therein. Significant noise reduction is accomplished by using a set of mass dampers in the clutch assembly. Mass dampers change the mode of vibration for the clutch gear during engagement thus reducing noise output during gear shifting. Mass dampers are attached to various clutch components. Exemplary clutch components with mass dampers attached thereto are illustrated as a clutch gear, clutch hub, or piston. Different types of mass dampers are also compatible with the illustrated and non-illustrated clutch components. In one embodiment, for example, dampers are sprung mass dampers coupled to a clutch gear. The uses of sprung mass dampers in some embodiments enable vibration control in multiple directions. The embodiments having sprung mass dampers have dual functionality—altering bending and torsion modes of vibration due to the outer rim effect. Exemplary clutch assemblies and methods of manufacture are discussed herein with reference to the figures.

In FIG. 1, there is shown a vehicle transmission 10 having an example of the noise reduction teachings discussed hereinbelow. The transmission 10 is a six-speed automatic transmission in this embodiment. Other types of transmissions are compatible with the present disclosure; five-, seven- and eight speed transmissions can utilize the mass dampers taught herein. In other embodiments, the transmission is a manual transmission. Any type of transmission may be used including, for example, electrically variable transmissions or continuously variable transmissions.

As shown in FIG. 1, a transmission clutch assembly 20 includes two mass dampers 30 connected to a clutch gear 40. The attachment method, as discussed hereinbelow, preserves a seal between an inner surface 50 of the clutch gear and an outer surface 60 of the clutch gear, which is exposed to other sections of the transmission. In this way the method of manufacture also yields increased stability for the transmission lubrication strategy.

The transmission bell housing 70 shown in FIG. 1 has a section partially cut away. In the center section of the transmission the clutch assembly 20 is positioned. The illustrated clutch assembly 20 includes the internal clutch gear 40 that is splined onto an output shaft 80. Clutch gear 40 sits on the inner diameter of a series of friction plates that are journaled onto the clutch gear 40. On the outer diameter of plates 90 a hub 100 encircles the plates. Clutch hub 100 is attached to the transmission input shaft 110 (as partially shown in FIG. 1). Nested within the clutch hub 100 is also a piston 120. Piston 120 is hydraulically actuable. Input shaft 110 is configured with a series of orifices (e.g., 130) to control lubrication. Output shaft 80 also has a series of orifices (e.g., 140) to control lubrication. Piston 120 is hydraulically actuated in this embodiment; however, in other embodiments, piston can be electrically actuable (for example using e-shift and/or a servo motor to initiate clutch engagement). In this embodiment, piston 120 actuates the clutch assembly 20 from the front section of the transmission to the rear section of the transmission. A return spring 150 is incorporated in the clutch assembly 20 between a fore and aft wall of the piston 120.

Internally mounted in the clutch gear 40 are two sprung mass dampers 30 as shown in FIG. 1. Sprung mass dampers 30 are attached to inner surface 50 (or inner diameter) of clutch gear as described below.

Figure 2:
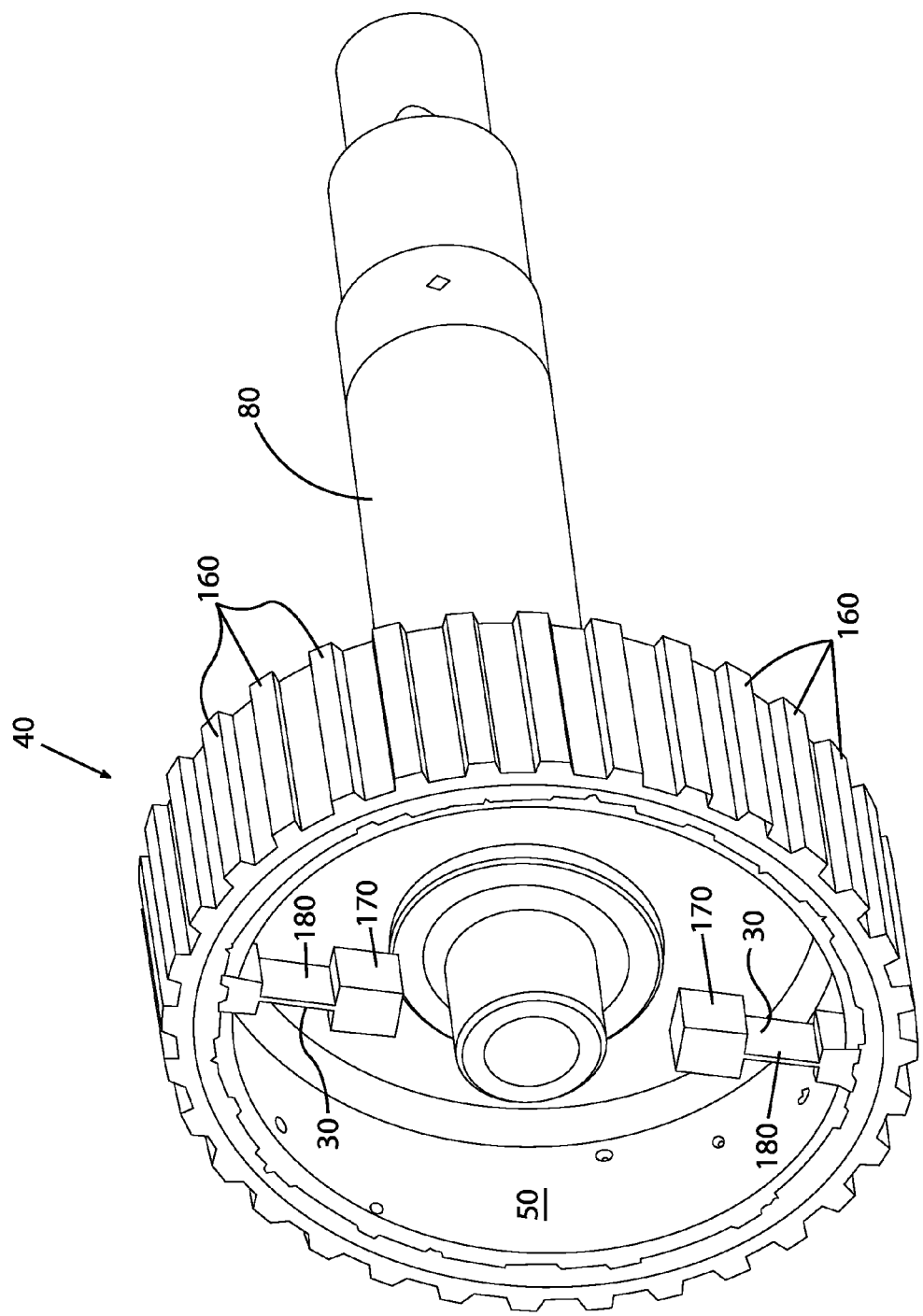
FIG. 2 is a perspective view of the clutch gear shown in FIG. 1.

Now with reference to FIG. 2, there is shown the clutch gear 40 of FIG. 1 in isolation. FIG. 2 is a perspective view of the clutch gear 40. As shown, clutch gear 40 is attached to the output shaft 80. Clutch gear 40 includes a series of teeth 160 formed on the clutch gear. Said teeth 160 are configured to engage with clutch plates (e.g., 90 as shown in FIG. 1). On the inner surface 50 or inner race of the clutch gear 40 are two sprung mass dampers 30. In this embodiment, sprung mass dampers 30 are shown to scale. In other embodiments, however sprung mass dampers 30 can be of different sizes and configurations. In this embodiment, clutch gear 40 is die cast using powder metallurgy. Clutch gear can be manufactured using any existing forming techniques including, for example, lathing, milling, stamping or welding.

Figure 4:
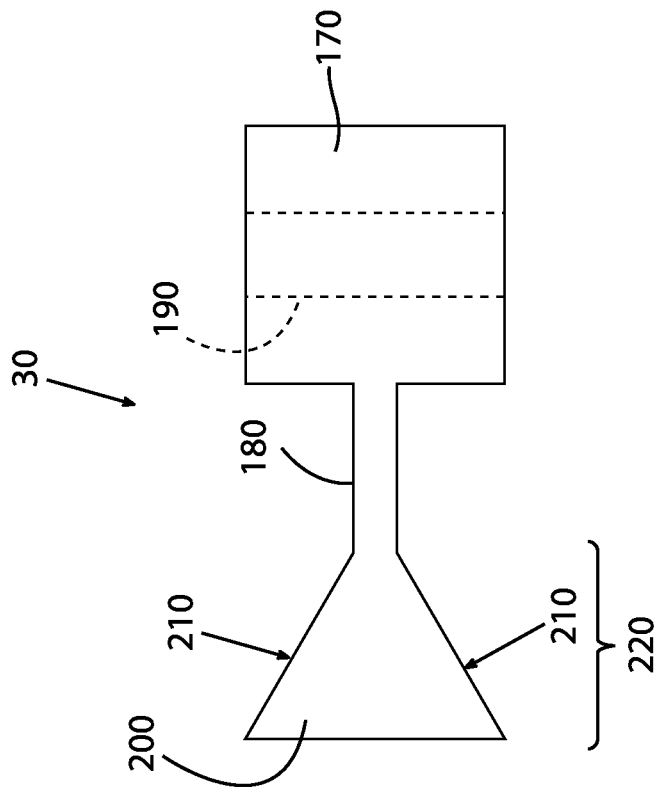
FIG. 4 is a top view of the mass damper of FIG. 3.
Figure 3:
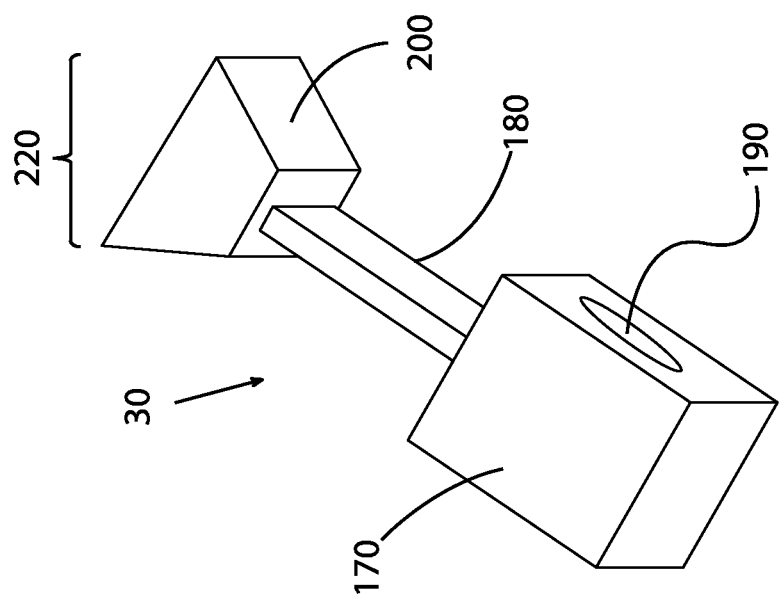
FIG. 3 is a perspective view of one mass damper used with the clutch gear of FIG. 2.

Sprung mass dampers 30 are press-fit into the inner surface 50 of clutch gear 40, as shown in FIG. 2. As shown in FIGS. 3 and 4, mass dampers 30 have a sprung mass 170 in a cantilevered orientation. The sprung mass 170 is free to vibrate with respect to the clutch gear 40 by the connector beam 180. FIG. 3 illustrates a perspective view of the sprung mass damper 30 used in the clutch gear 40 of FIG. 2.

As shown in FIGS. 3 and 4 mass damper 30 includes one sprung mass 170. Sprung mass 170 is located at one end of the damper 30. The mass 170 is configured in a rectangular shape in this embodiment. An orifice (or tuning hole) 190 is included in a center section of the mass 170 to control the weight of the mass. In this way, the same configuration for mass damper 170 can be implemented in different transmissions. Weight adjustments can be made to mass damper by enlarging or decreasing the size of orifice 190 in the mass 170.

At another end of the damper, as shown in FIGS. 3 and 4, an anchor 200 is included at the base of the damper 30. Anchor 200 is triangularly shaped in this embodiment. Anchor 200 includes two angularly dispose prongs 210 at end 220 of the damper. Said prongs 210 are configured to fit in receptors formed in the clutch gear. Damper 30 is composed of steel. Damper 30 can also be composed of other materials, e.g., aluminum, stainless steel, polymers or a combination of any of the aforementioned materials. In this embodiment, damper 30 is formed using a powder metallurgy process. Orifice 190 is formed in damper 30 using a drilling process. Other forming techniques for mass damper will be appreciated by ordinary artisans as being within the scope of the present disclosure including, but not limited to, stamping, milling, molding, or extrusion.

Figure 5:
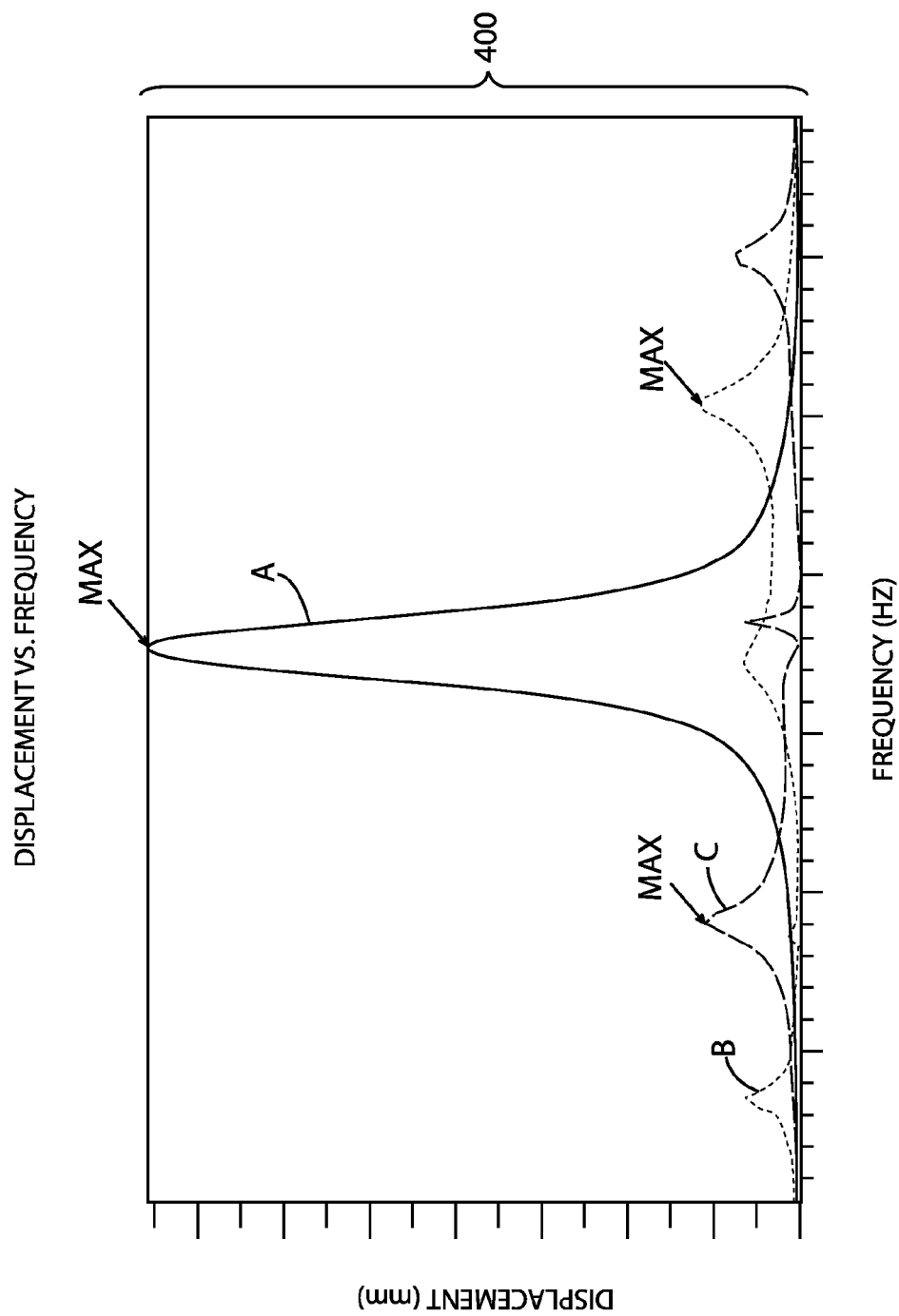
FIG. 5 is a graph of displacement versus frequency for various clutch gears.

Now with reference to FIG. 5, there is shown therein some exemplary test results for different clutch gears expressed in graph 400. Testing was performed on a smaller scale than typical transmission operation. On the y-axis is displacement of the clutch during engagement. Displacement is measured in the form of millimeters. On the x-axis is frequency in Hertz. Line A represents data taken from a clutch gear not having any dampers incorporated therein. The maximum displacement of the rim hub represented by Line A is approximately 0.0007 mm and occurs at a frequency of 578 Hz. This baseline of 578 Hz is where the amplitude of the vibration curve is located for the clutch hub during engagement.

Lines B and C, as shown in FIG. 5, represent test data from clutch hubs having sprung mass dampers incorporated therein (e.g., as shown in FIGS. 2-3 and the above disclosure). The displacement curve of the clutch gear having sprung mass dampers attached thereto has a substantially smaller amplitude than the amplitude of the clutch gear without mass dampers. As shown in FIG. 5, the hubs associated with Lines B and C have a split mode of vibration. The double modes separate the maximum displacement of the clutch hub to avoid coupling with clutch resonance and avoid noise instability. The amplitude (or maximum) of the displacement versus frequency curve for Line B is approximately 0.0001 mm. This occurs at approximately 585 Hz. The amplitude of the displacement versus frequency curve for Line C is also approximately 0.0001 mm. This occurs at approximately 569 Hz.

As explained above the sprung mass dampers as discussed with respect to FIGS. 2 through 4 reduce unwanted vibration in at least two directions. Sprung mass dampers also reduce torque variation in the clutch assembly as demonstrated in the test results discussed hereinbelow. Referring now to Table 1, there is shown therein test data for a control clutch hub and a hub having the benefit of the present teachings. The torque variation was measured for each clutch hub at different pressure levels within the transmission. At a gross pressure of 0.86 MPa the clutch hub with dampers demonstrated a significantly lower torque variation than the clutch hub without dampers (90 Nm as compared to 290 Nm). A sample was taken at 0.99 MPa for each clutch hub. At this pressure the hub without dampers experienced 550 Nm of torque variation and the clutch with dampers experienced only 290 Nm in torque variation. Next measurements were taken at 1.13 MPa. The clutch hub without dampers experienced 850 Nm in torque variation while the clutch hub with dampers experienced 730 Nm of torque variation. Lastly, at the highest pressure tested (1.26 MPa) the clutch hub without dampers experienced 880 Nm of torque variation. The clutch hub with dampers only experienced 290 Nm of torque variation.

TABLE 1

Test Outcome for Clutch Hub with and without Dampers

| Test sample Type | Torque Variation | | | |
|---|---|---|---|---|
| Clutch hub without damper | 290 Nm | 550 Nm | 850 Nm | 880 Nm |
| Clutch hub with tuned mass damper | 90 Nm | 290 Nm | 730 Nm | 290 Nm |

Figure 7:
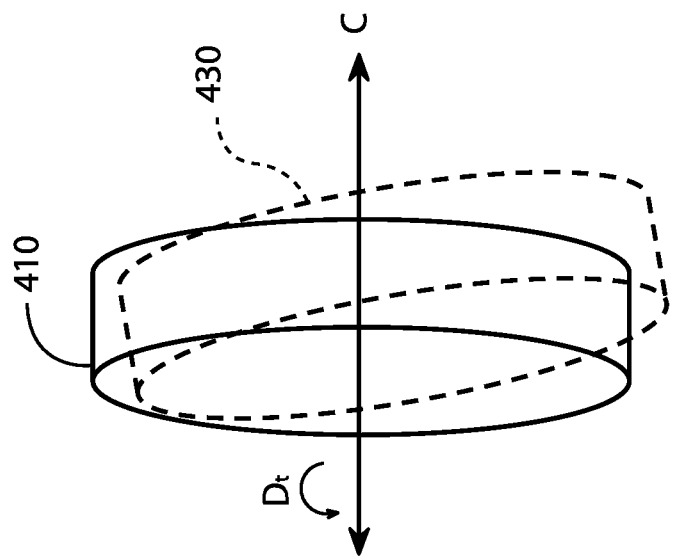
FIG. 7 is a schematic of the clutch component of FIG. 6 shown in another mode of vibration with respect to another direction.
Figure 6:
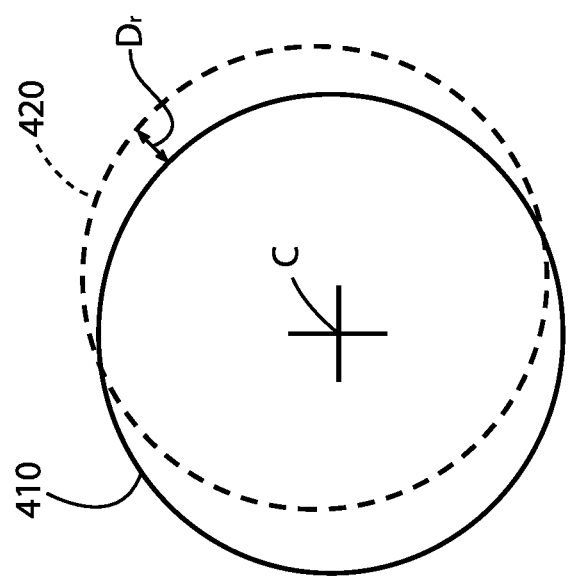
FIG. 6 is a schematic of an exemplary clutch component showing a mode of vibration with respect to one direction.

As explained above, sprung mass dampers are configured to alter the mode of vibration of the clutch component in two directions. Sprung mass dampers are multi-directional mass dampers. With reference to FIGS. 6 and 7, there is shown therein an exemplary clutch component 410 schematically shown with respect to two directions of vibration. FIG. 6 is a schematic of an exemplary clutch component 410 showing an out-of-plane mode of vibration in one direction. FIG. 7 is a schematic of the clutch component of FIG. 6 shown in another out-of-plane mode of vibration in another direction. The clutch component is shown in solid line centered with respect to a central axis, C. Central axis represents the center of a transmission shaft (e.g., the input or output shaft about which the clutch component is configured to rotate). The solid line indicates the clutch component position when aligned with the central axis. Though the clutch component 410 is shown with uniform radius, any clutch component including those with a non-uniform radius can be used with the mass dampers. This position is the position of the clutch component when not engaged. When engaged the clutch component vibrates with respect to the central axis. The maximum out-of-plane mode of vibration is illustrated by the broken line shown in FIG. 6, e.g., at position 420. The clutch component is displaced along the radius of the component as shown. Mass dampers are configured to change the mode of vibration of the clutch component along the radial direction, $D_r$, of the clutch component.

As shown in FIG. 7, sprung mass dampers are configured to alter the mode of vibration with respect to another direction—as shown the secondary direction is a torsional disposition, $D_t$. In FIG. 7, the clutch component 410 is shown in side perspective view positioned with respect to central axis, C. During engagement, clutch component rotates slightly counter clockwise as shown by the broken line at position 430. The maximum displacement of the clutch component is shown at position 430. As discussed with respect to Table 1, sprung mass dampers are configured to substantially reduce torque variation in the clutch component.

Figure 8:
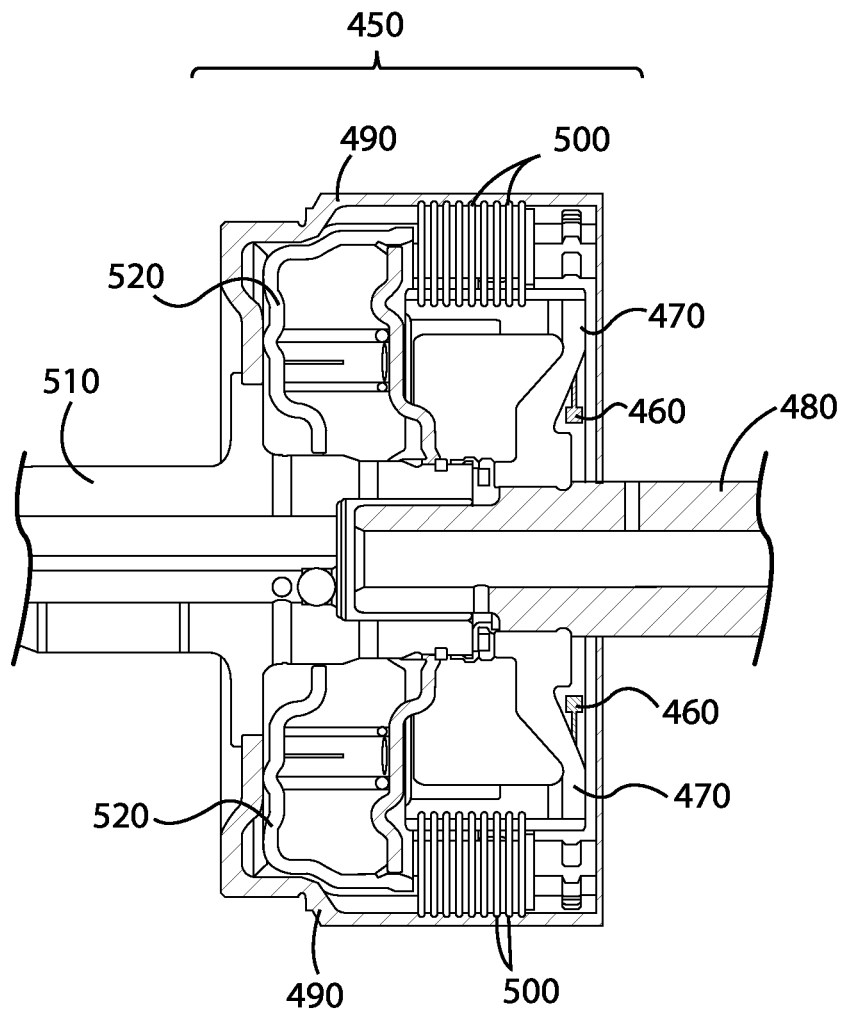
FIG. 8 is a side cross-sectional view of another exemplary clutch assembly having sprung mass dampers disposed therein.

As shown in FIG. 8, another transmission clutch assembly 450 includes exemplary squawk reduction techniques. The transmission clutch assembly 450 includes two mass dampers 460 connected to a rearward surface of a clutch gear 470. The illustrated clutch assembly includes the internal clutch gear 470 that is splined onto an output shaft 480. Clutch gear 470 sits on the inner diameter of a series of friction plates 500 that are journaled onto the clutch gear. On the outer diameter of plates 500 a hub 490 encircles the clutches 500. Clutch hub 490 is attached to the transmission input shaft 510. Nested within the clutch hub 490 is a piston 520. In this embodiment, piston 520 actuates the clutch assembly from the front section of the transmission to the rear section of the transmission. Mass dampers 460 are separated at 180 degrees with respect to each other. Mass dampers 460 are configured to alter the mode of vibration for the clutch assembly in two directions. Mass dampers 460 are attached to the clutch gear 470 using a press-fit procedure. Any type of attachment method can be used including, for example, welding, molding, milling, fastening or lathing. Mass dampers 460 are sprung mass dampers. In this embodiment, mass dampers 460 are composed of steel.

Figure 9:
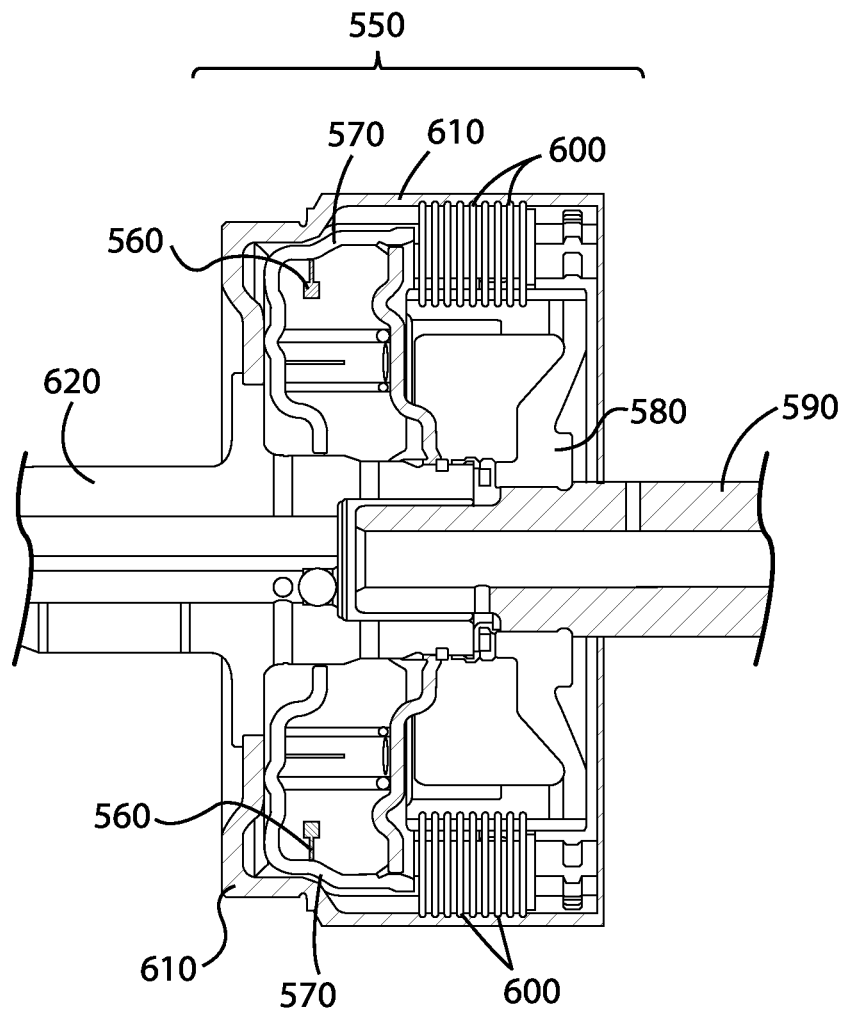
FIG. 9 is a side cross-sectional view of another exemplary clutch assembly having sprung mass dampers disposed therein.

As shown in FIG. 9, a transmission clutch assembly 550 includes two mass dampers 560 connected to a surface of a piston 570 in the clutch assembly. The illustrated clutch assembly 550 shown in FIG. 9 includes an internal clutch gear 580 that is splined onto an output shaft 590. Clutch gear 580 sits on the inner diameter of a series of friction plates 600 that are journaled onto the clutch gear. On the outer diameter of the plates a hub 610 encircles the clutches 600. Clutch hub 610 is attached to the transmission input shaft 620. Nested within the clutch hub 610 is also the piston 570. In this embodiment, piston 570 actuates the clutch assembly from the front section of the transmission to the rear section of the transmission. Mass dampers 560 are separated at 180 degrees with respect to each other and extend along the radius of the piston 570. Mass dampers 560 are configured to alter the mode of vibration for the piston in two directions. Mass dampers 560 are attached to the piston 570 using a press-fit procedure with reinforcement welds. Any type of attachment method can be used including, for example, welding, molding, milling, fastening or lathing. In this embodiment, mass dampers are composed of steel.

Figure 10:
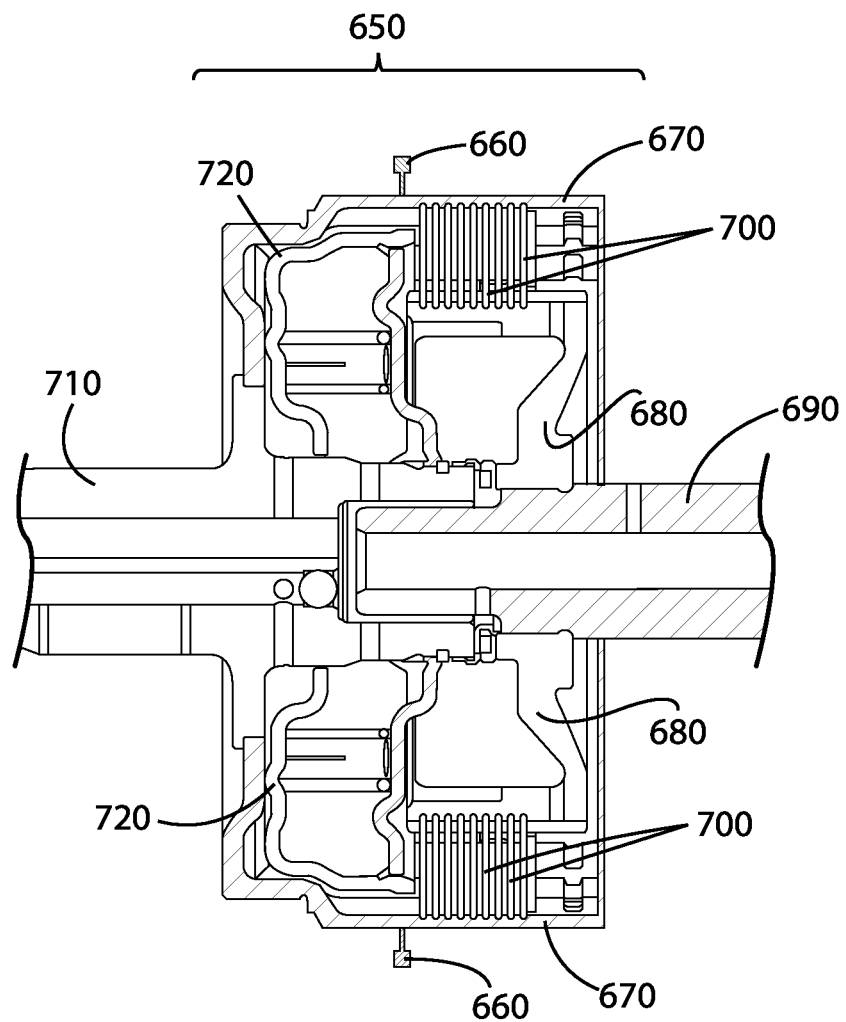
FIG. 10 is a side cross-sectional view of another exemplary clutch assembly having sprung mass dampers disposed therein.

As shown in FIG. 10, another transmission clutch assembly 650 includes exemplary squawk reduction techniques. The transmission clutch assembly 650 includes two mass dampers 660 connected to a surface of an externally mounted clutch hub 670 in the clutch assembly. The illustrated clutch assembly 650 shown in FIG. 10 includes an internal clutch gear 680 that is splined onto an output shaft 690. Clutch gear 680 sits on the inner diameter of a series of friction plates 700 that are journaled onto the clutch gear 680. Clutch hub 670 is attached to the transmission input shaft 710. Nested within the clutch hub 670 is also a piston 720. Mass dampers 660 are separated at 180 degrees with respect to each other and extend along the radius of the clutch hub 670. Mass dampers 660 are configured to alter the mode of vibration for the clutch assembly 650 in two directions. Mass dampers 660 are attached to the clutch hub 670 using a press-fit procedure. Any type of attachment method can be used including, for example, welding, hydro-forming, molding, milling or lathing. In this embodiment, mass dampers are composed of steel.

Figure 11:
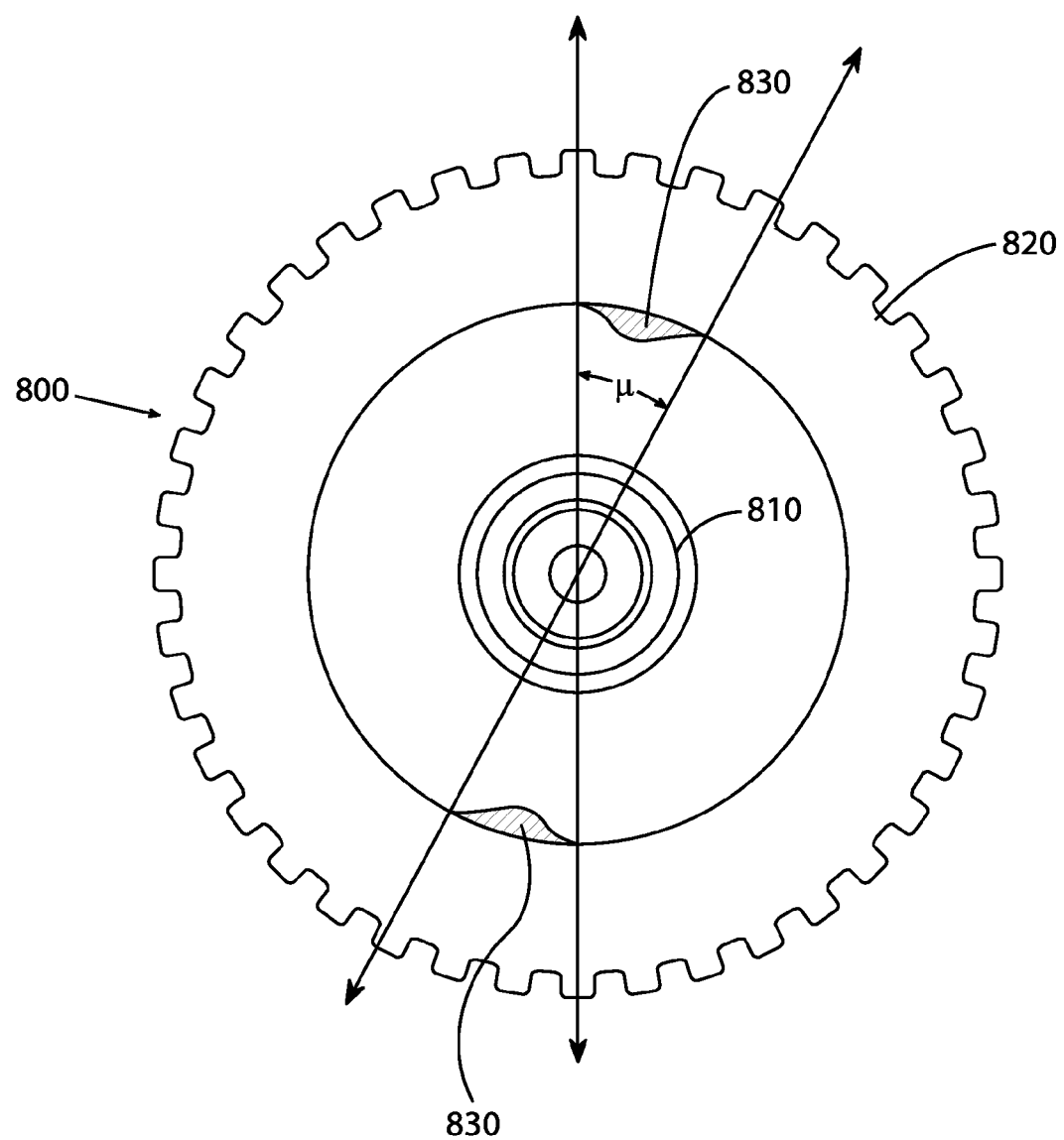
FIG. 11 is a side cross-sectional view of another clutch gear having an exemplary concentrated mass damper attached thereto.

Now referring to FIG. 11, there is a clutch gear 800 having a different type of (tuned) mass damper attached thereto. The clutch gear 800 of FIG. 11 is an internal clutch gear that is attached to a transmission shaft 810. Clutch gear 800 has a toothed circumference 820 onto which a plurality of friction plates or clutches can be journaled. In this embodiment, mass dampers 830 are concentrated mass dampers configured to apply a localized force to the clutch gear during operation. Concentrated mass dampers are composed of a homogenous material of relatively high density, e.g., steel. In this embodiment the arc degree of the application force for the dampers is expressed as mu, μ. Dampers 830 are configured to apply a force along an acute arc degree of approximately 30 degrees.

Dampers 830 are composed of the same material as clutch gear 800 in this embodiment. Dampers 830 is formed with clutch gear in a die cast process. Concentrated mass dampers can also be attached to different sections of the clutch gear 800. For example, in other embodiments mass dampers are attached to the outer surface of clutch gear (e.g., as shown and discussed with respect to FIG. 8). Concentrated mass dampers are also mounted on other clutch components in other embodiments. Said exemplary clutch components include, but are not limited to, other clutch hubs or a clutch piston.

Figure 12:
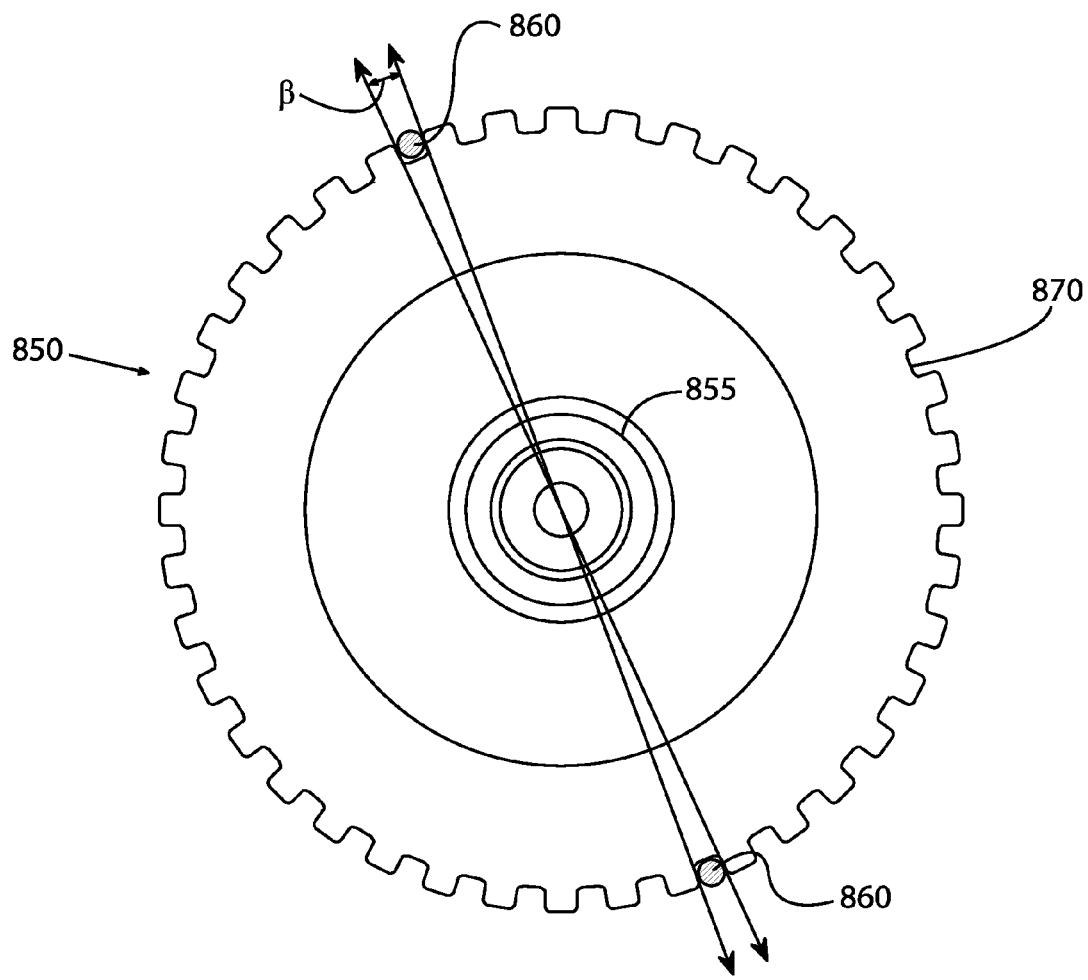
FIG. 12 is a side cross-sectional view of another clutch gear having another exemplary concentrated mass damper attached thereto.

Now referring to FIG. 12, there is a clutch gear 850 having a different type of (tuned) mass dampers 860 attached thereto. The clutch gear 850 of FIG. 12 is another internal clutch gear that is attached to a transmission shaft 855. Clutch gear has a toothed circumference 870 onto which a plurality of friction plates or clutches can be journaled. In this embodiment, mass dampers 860 are concentrated mass dampers configured to apply a localized force to the clutch gear 850 during operation. In this embodiment the arc degree of the application force for the dampers 860 is expressed as beta, β. Dampers 860 is configured to apply a force along an acute arc degree of approximately 5 degrees.

Dampers 860 are composed of the same material as clutch gear 850 in this embodiment. Dampers 860 are formed with clutch gear 850 in a die cast process. Concentrated mass dampers of this configuration and others can be attached to different sections of the clutch gear. For example, in other embodiments mass dampers are attached to the outer surface of clutch gear. Damper is also mounted on other clutch components in other embodiments. Said exemplary clutch components include, but are not limited to, other clutch hubs or a clutch piston. More of fewer than two mass dampers can be coupled to the clutch component to reduce squawk. In other embodiments three concentrated mass dampers are equidistantly positioned around the circumference of a clutch gear.

Disclosed are exemplary methods of manufacturing a transmission clutch assembly with reduced squawk during engagement. One exemplary method includes: forming a clutch component (e.g., the clutch gear 40 as shown in FIG. 2); determining a mode of vibration for the clutch component during clutch engagement (as discussed, for example, with respect to FIGS. 6 and 7); and coupling a plurality of mass dampers to the clutch component (e.g., 30 as shown in FIG. 2) to split the mode of vibration for the clutch component during engagement with respect to a first direction. The method can also include incorporating a plurality of mass dampers into the clutch component to split a mode of vibration for the clutch component during engagement with respect to a second direction (as discussed with respect to FIG. 7).

Those familiar with the art to which this invention relates will recognize various alternative designs and embodiments for practicing the invention within the scope of the appended claims. For example, lumped mass dampers or other types of dampers can be used with any clutch component to provide squawk reduction.

We claim:

1. A vehicle transmission clutch assembly, comprising:
   a clutch;
   a clutch component engaging the clutch and configured to rotate with a transmission input shaft provided the clutch is engaged; and
   spaced apart mass dampers, each having an anchor rotationally fixed to the clutch component, an elongated resilient beam extending radially from the anchor and a mass mounted on an opposite free end of the beam from the anchor.

2. The clutch assembly of claim 1, wherein the clutch component is a clutch gear.

3. The clutch assembly of claim 1, wherein the mass dampers are located radially inward from friction plates in the clutch.

4. The clutch assembly of claim 1, wherein the clutch component is a piston.

5. The clutch assembly of claim 1, wherein each of the masses of the mass dampers is rectangular with a tuning hole extending through the mass.

6. The clutch assembly of claim 1, wherein each of the mass dampers is coupled to an inner surface of the clutch component, with the elongated beam extending radially inward from the anchor.

7. The clutch assembly of claim 1, wherein the mass dampers are composed of steel.

8. The clutch assembly of claim 1, wherein the mass dampers are separated by at least 90 degrees on the clutch component.

* * * * *